United States Patent Office 2,706,200
Patented Apr. 12, 1955

2,706,200

PREPARATION OF S-ARYL-THIOSULFURIC ACIDS

Hans Z. Lecher, Plainfield, and Elizabeth M. Hardy, Bound Brook, N. J., assignors to American Cyanamid Company, New York, N. Y., a corporation of Maine No Drawing. Application May 14, 1953,
Serial No. 355,178

11 Claims. (Cl. 260—370)

This invention relates to an improved method of preparing S-aryl-thiosulfuric acids and their salts and includes certain of these compounds as new chemical compounds.

In the past S-aryl-thiosulfuric acids have been difficult to prepare. About the only method was generally applicable involved the reaction of aromatic thiols with sulfur trioxide-tertiary amine compounds such as pyridine-sulfur trioxide or dimethyl aniline-sulfur trioxide. The method is expensive as it is necessary first to prepare the aromatic thiol and even then the reagents are moderately expensive. Other methods which have been proposed involve reaction of thiosulfuric acid with quinones or quinone diimines. This method of course is restricted to certain compounds. Another method also starting from aromatic thiols or disulfides containing a basic group such as an amino group involves treatment with sulfurous acid and air. Here again the process is limited in its applicability.

The present invention is directed to a new simple process of preparing S-aryl-thioculfuric acids and their salts which is generally applicable and which is sufficiently cheap.

Essentially the process of the present invention starts out from an entirely different class of compounds, namely, amides of aromatic sulfenic acids. These compounds need only be reacted with aqueous sulfurous acid, easily obtained by passing $SO_2$ into an aqueous reaction medium. The process produces the corresponding amine salt of the S-aryl-thiosulfuric acid according to the following general reaction,

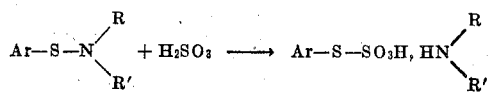

where Ar is the aromatic radical desired.

Many of the amides of aromatic sulfenic acids are slightly soluble in water and in such a case water can constitute the reaction medium. Other amides are too insoluble in water, and in this case the reaction medium may be a mixture of a water miscible organic solvent such as alcohol, acetone, dioxane or the like with some water.

The conditions of the reaction are not particularly critical. In general, it is started at about room temperature and the temperature raised until the reaction is complete. Advantageously the final temperature may be determined by the boiling point of the reaction medium used which permits an accurate temperature control by operating under reflux. The amine salt produced by the reaction may be recovered by clarifying the reaction mixture and concentrating by evaporation under reduced pressure or the amine salt may be transformed into any other salt and the latter recovered.

The particular nature of the amide radical is not in any way critical. Thus R and R' may be hydrogen, alkyl, cycloalkyl, or aryl groups and it does not make any particular difference whether the R and R' are the same or different radicals. R and R' may also be part of a heterocyclic ring such as in a piperidide, morpholide, piperazide and the like.

The aryl group may also vary in wide limits. Thus it may be an unsubstituted aryl group such as phenyl or naphthyl or it may be a homolog such as alkyl phenyl or alkyl naphthyl or it may have other substitutent groups such as alkoxy, halogen, nitro, carbonyl, nitrile and the like.

The process produces in the first instance the amine salt of the S-aryl-thiosulfuric acid. This can easily be transformed into any other suitable salt by metathesis. The particular cation is not critical, and in general may be any one of the common metals such as alkali metals, metals of the second group of the periodic system, polyvalent metals such as aluminum, iron, zinc and the like.

The S-aryl-thiosulfuric acids are useful intermediates in the synthesis of drugs and dyes and the S-m-nitro-phenyl-thiosulfuric acid and its salts, which are new compounds and which are included in the present invention, are of marked value as veterinary drugs in the treatment of coccidiosis of chickens.

It is another advantage of the present invention that the process in some cases may be used for the preparation of pure aromatic thiols. Thus the S-aryl-thiosulfuric acids when hydrolyzed with mineral acids are split into sulfuric acid and the corresponding thiol. Alkaline hydrolysis, on the other hand, produces an unstable sulfenic acid which disproportionates with formation of the disulfide and the sulfinic acid.

The invention will be described in greater detail in conjunction with the specific examples in which the parts are by weight unless otherwise specified.

EXAMPLE 1

*Dimethylamine salt of S-2-nitrophenylthiosulfuric acid*

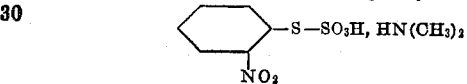

Three parts by weight of 2-nitrobenzene sulfenyl dimethylamide was suspended in 100 parts of water. Sulfur dioxide was passed in whereupon most of the solid went into solution. The reaction was completed at a temperature of 45° to 50° C. The yellow solution obtained was clarified and then evaporated under reduced pressure. The resulting compound showed a melting point of 105° to 107° C. and gave a correct analysis.

The yellow potassium salt of the S-2-nitrophenylthiosulfuric acid is precipitated from an aqueous solution of the dimethylamine salt by addition of potassium chloride or from a methanol solution by potassium hydroxide. This potassium salt is sparingly soluble; the sodium salt, however, is easily soluble in water.

When an aqueous solution of any of these salts is treated with caustic alkali, it is hydrolyzed to sulfite and the deep blue sulfenate.

EXAMPLE 2

*Cyclohexylamine salt of S-2,4-dinitrophenylthiosulfuric acid*

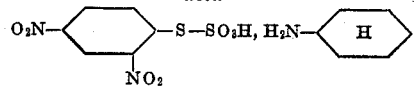

Twenty grams of 2,4-dinitrobenzenesulfenyl cyclohexylamide was dissolved in 500 cc. of alcohol. One liter of a solution of sulfur dioxide in water was added and sulfur dioxide was passed in while the mixture was heated close to the boiling point. On cooling, the desired compound separated out and was recovered by filtration. The compound, which showed the correct analysis, does not have a definite melting point but is decomposed on heating above 189° C.

The potassium salt is precipitated from a methanol solution of the cyclohexylamine salt by addition of a solution of potassium hydroxide in methanol. The cyclohexylamine salt is only moderately soluble in water. When sodium hydroxide is added to the aqueous solution, the deep red-brown sulfenate together with sulfite is formed by hydroylsis.

EXAMPLE 3

*Piperidine salt of S-2,4-dinitrophenylthiosulfuric acid*

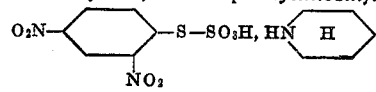

The corresponding sulfenyl piperidide used as starting material can be conveniently prepared by reaction of 2,4-dinitrobenzenesulfenyl chloride with 2 molecules of piperidine in an inert organic solvent. The piperidine hydrochloride formed is filtered off and the filtrate is evaporated. The 2,4-dinitrobenzenesulfenyl piperidide melts at 143° to 145° C. and gave the correct analysis. For the preparation of the thiosulfuric acid derivative 20 grams of this piperidide was dissolved in 1 liter of alcohol and then 500 cc. of a concentrated sulfur dioxide solution in water was added. The originally orange solution was immediately decolorized. The reaction was finished by heating close to the boiling point. The solution was evaporated under reduced pressure and gave an excellent yield of the piperidine salt which melted at 125° to 130° C. (with decomposition) and showed the correct analysis. The product dissolves easily in water and acetone and is also soluble in alcohol and chloroform, but insoluble in ether.

EXAMPLE 4

*Aniline salt of S-phenylthiosulfuric acid*

C$_6$H$_5$S—SO$_3$H, H$_2$NC$_6$H$_5$

Twenty grams of the anilide of benzenesulfenic acid was treated with one liter of a concentrated solution of sulfur dioxide in water. The mixture was gradually heated to the boil whereupon the anilide went into solution. The clarified solution was concentrated under reduced pressure and gave colorless crystals of the aniline salt in excellent yield. A sample when purified by dissolving in alcohol and reprecipitating with ether showed the melting point of 179 to 181° C. and gave a correct analysis. The product is soluble in alcohol as well as in water.

EXAMPLE 5

*Ammonium salt of S-1-anthraquinonylthiosulfuric acid*

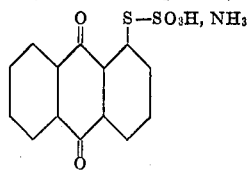

Ten grams of alpha-anthraquinonesulfenyl amide was slurried with 1 liter of alcohol and 100 cc. of water. Then sulfur dioxide was passed into the orange slurry whereupon the temperature rose slightly and the solid gradually went into solution. The reaction was finished by heating to the boil. The solution was clarified, and the product was precipitated by adding ether. It melted above 300° C. and gave a correct analysis.

The potassium salt of S-1-anthraquinonylthiosulfuric acid is precipitated from a methanol solution of the ammonium salt by addition of potassium hydroxide. Aqueous solutions of these salts are hydrolyzed by caustic alkali with formation of sulfite and green-blue sulfenate.

EXAMPLE 6

*Diethylamine salt of S-3-nitrophenylthiosulfuric acid*

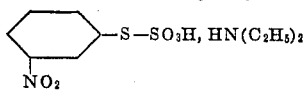

Forty parts by weight of carbon tetrachloride is saturated with chlorine at 0° C., 25 parts by weight of 3,3'-dinitrodiphenyldisulfide slurried in another 40 parts by weight of carbon tetrachloride is added. The resulting orange solution is stirred for 2 hours and then gradually added to a solution of 30 grams of diethylamine in 160 parts by weight of carbon tetrachloride with stirring and cooling. The resulting slurry is stirred at room temperature for 3 hours and filtered. The filtrate is evaporated under reduced pressure, leaving behind an amber liquid which is the crude diethylamide of m-nitrobenzenesulfenic acid.

Six parts by weight of this crude amide is slurried in 80 parts by weight of ethanol and 10 parts of water and sulfur dioxide is passed into the slurry for one hour. The solution is heated to 50 to 60° C., clarified and evaporated, leaving behind the diethylamine salt of the thiosulfuric acid in crude form. It may be purified by dissolving in alcohol and precipitating with ether, and shows a melting point of 89 to 90° C. and gave a correct analysis.

The S-3-nitrophenylthiosulfuric acid forms water-soluble sodium, potassium, calcium, barium, zinc, copper and ferric salts which may be prepared by a metathetic reaction. The potassium salt is quite insoluble in methanol and is therefore easily prepared by adding potassium hydroxide to the methanol solution of the diethylamine salt.

EXAMPLE 7

*Dicyclohexylamine salt of S-3-nitrophenylthiosulfuric acid*

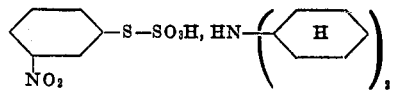

Forty parts by weight of carbon tetrachloride is saturated with chlorine at 0° C. Twenty-five parts by weight of 3,3'-dinitrodiphenyl-disulfide slurried in another 40 parts by weight of carbon tetrachloride is added. The resulting orange solution is stirred for 2 hours and then added to a solution of 60 parts by weight of dicyclohexylamine in 160 parts by weight of carbon tetrachloride with stirring and cooling. The resulting reddish brown slurry is stirred at room temperature for one hour more and filtered. The filtrate is evaporated under reduced pressure, leaving behind a dark reddish amber sirup which is the crude dicyclohexylamide of m-nitrobenzenesulfenic acid.

Six parts by weight of this crude amide is slurried with 80 parts by weight of ethanol and 10 parts of water, and sulfur dioxide is passed into the slurry for 1 to 2 hours. A large proportion of the amide goes into solution. The mixture is heated to the boil and filtered. The resulting solution is evaporated, leaving behind the dicyclohexalamine salt of the thiosulfuric acid in crude form. A sample purified by dissolving in alcohol and precipitating with ether showed a melting point of 145 to 147° C. and gave a correct analysis.

We claim:

1. A process for preparing salts of S-aryl thiosulfuric acids which consists in treating carbocyclic aromatic sulfenamides with aqueous sulfurous acid.
2. A method according to claim 1 in which the aqueous sulfurous acid contains alcohol.
3. A process according to claim 2 in which the sulfenamide is a m-nitrobenzenesulfenamide.
4. A process according to claim 1 in which the sulfenamide is a m-nitrobenzenesulfenamide.
5. A process according to claim 1 in which the sulfenamide is a 2-nitrobenzenesulfenamide.
6. A process according to claim 1 in which the sulfenamide is a 2,4-dinitrobenzenesulfenamide.
7. A process according to claim 1 in which the sulfenamide is a benzensulfenamide.
8. A process according to claim 1 in which the sulfenamide is a 1-anthraquinonesulfenamide.
9. Compounds of the formula

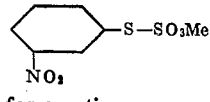

where Me stands for a cation.

10. Compounds according to claim 9 in which the cation is an ammonium ion derived from an amine.
11. A compound of the formula

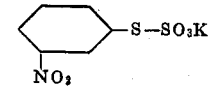

References Cited in the file of this patent

FOREIGN PATENTS 530,733    Germany _____ June 7, 1930